United States Patent
Childs

[15] 3,655,525
[45] Apr. 11, 1972

[54] SLUDGE REMOVAL FROM ELECTROCHEMICAL CELL

[72] Inventor: William V. Childs, Bartlesville, Okla.

[73] Assignee: Phillips Petroleum Company

[22] Filed: Feb. 25, 1970

[21] Appl. No.: 14,063

[52] U.S. Cl. ..........................204/1 R, 204/59, 204/232, 204/237, 204/242, 204/279
[51] Int. Cl. ..........................................B01k 3/00
[58] Field of Search..................204/232, 279, 59, 237, 238, 204/239, 240, 1 R, 242

[56] References Cited

FOREIGN PATENTS OR APPLICATIONS 351,277  6/1931  Great Britain..........................204/279

Primary Examiner—G. L. Kaplan
Attorney—Young and Quigg

[57] ABSTRACT

Circulation of electrolyte in an electrochemical cell, e.g., fluorination cell, is maintained sufficiently high to keep solids in suspension. In the cell there is a relatively small settling zone provided with a removal bucket or other means for disposing of sludge which is collected in said zone. A cyclone arrangement, deceleration through an orifice or other means can be provided to cause the sludge to enter the bucket. Natural gas-lift combined with convection circulation can be relied on to maintain sufficient velocity to keep the sludge in suspension throughout the cell except in the settling section. The cell is usually equipped with cooling means such as a tubes-and-sheets heat exchanger structure.

7 Claims, 1 Drawing Figure

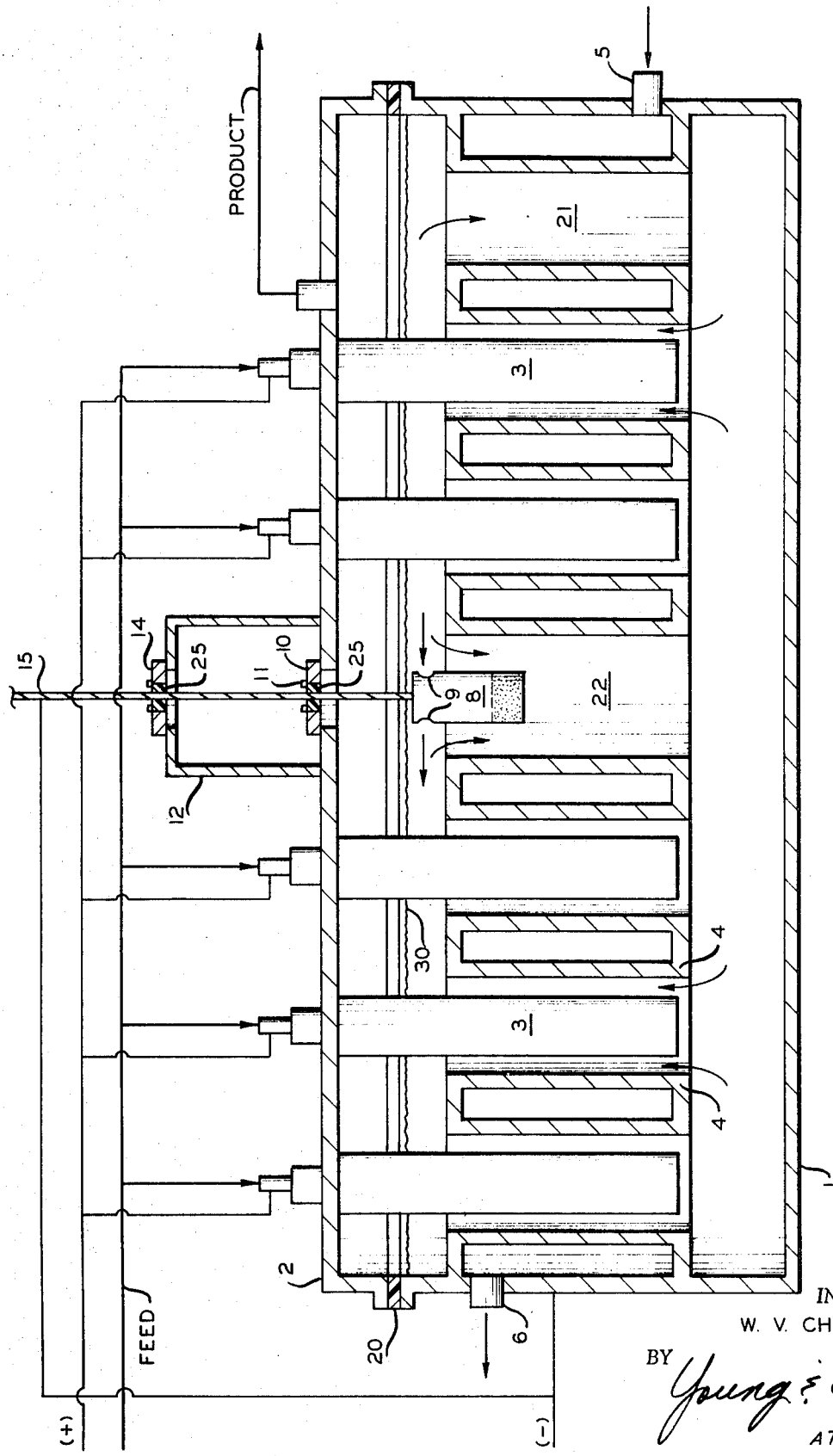

SLUDGE REMOVAL FROM ELECTROCHEMICAL CELL

This invention relates to an electrochemical cell and to a method for operating same. More particularly, it relates to electrochemical fluorination in which in the electrolyte employed there is formed and accumulated a sludge.

According to a concept of the invention it provides a method for operating an electrochemical cell by providing a settling section in said cell and in said section providing a removable container or bucket into which the electrolyte is circulated in a manner that sludge formed and maintained in suspension in the electrolyte will settle into said bucket whereupon the bucket can be at least periodically removed to remove the sludge from the cell.

According to another concept of the invention there is provided an electrochemical cell structure having a settling section therein, a removable receiver or bucket in said settling section for removing sludge which settles in said bucket while the cell is in operation and the electrolyte is moving at least by natural convection in said cell and therefore into proximity of said bucket.

A problem encountered in designing plant scale electrochemical fluorination cells has been that of providing suitably at low cost for collection and removal of accumulated sludge. Usually, extra space at the bottom of the cell has been provided into which the sludge has been allowed to accumulate until it must be removed. Although this is a simple solution to the problem it is quite expensive. Sludge in such a cell is formed primarily between water, the 2HF·KF electrolyte, and the metallic components of the cell structure to form a complex compound containing potassium, fluorine, and metal. The water enters the cell in small amounts in the feed-streams and when the cell is periodically opened.

It has now occurred to me to make use of the natural gas-lift circulation or convection in the cell to maintain sufficient velocity to keep the sludge in suspension in the electrolyte throughout the entire cell except in a classifying section or settling section or zone wherein the velocity of circulation is lowered so that the sludge can settle. For example, there can be placed in the line of circulation of the sludge bearing electrolyte an orifice beyond which is placed the settling section and whatever means there are to be employed in said settling section for removing the sludge, i.e., withdrawal means which can be simply illustrated as a bucket. Also the circulating sludge bearing electrolyte can be passed through a cyclone arrangement operated in conjunction with or even in the settling section to cause the sludge to agglomerate and to be retained in said section. Thus, the sludge caused to settle in the settling section can be rapidly removed as desired at least periodically, but also continuously depending upon the means selected for its removal. The invention will be illustrated with the use of a bucket.

The advantages of the present invention include cheaper cell construction, lower operating voltage because suspended sludge which increases resistance is continuously being removed from the electrolyte, if not from the cell, and the ready removal of sludge from an upper portion of the cell in the now preferred embodiment of the invention makes the structure simple and clean-out is achieved.

An object of this invention is to provide an electrochemical cell. Another object of the invention is to provide an electrofluorination cell. Another object of the invention is to provide a cell structure which can be operated providing for at least periodic, if not continuous, withdrawal of sludge formed in the electrolyte. A further object of the invention is to provide an electrochemical cell structure which permits removal of sludge formed in the electrolyte in a simple, inexpensive manner. A further object of the invention is to provide an electrochemical cell structure from which during operation sludge can be removed from the electrolyte therein contained without disturbing the operation or any other structural element of the cell needed for such operation. A still further object of the invention is to provide a method for operating an electrochemical cell, e.g., a fluorination cell. Another object still is to provide a method for the operation of an electrochemical cell, e.g., fluorination cell, wherein during the operation sludge suspended in the electrolyte is removed therefrom thus to maintain as low as possible electrical resistance in the electrolyte.

Other aspects, concepts and objects, as well as the several advantages, of the invention are apparent from a study of this disclosure, the drawing and the appended claims.

According to the present invention there is provided an electrochemical cell structure having an electrolyte settling section, a means to receive settled sludge and to retain the same in said settling section and means for removing settled sludge from said section, said section being in a part of the said cell relative to the remaining structure in the cell that the sludge can be removed therefrom without removing or disturbing any other structure or apparatus element in said cell, the cell being so constructed and arranged that during its operation at least a natural convection will cause electrolyte to pass into and through said settling section.

Also according to the present invention there is provided a method for operating an electrochemical cell which comprises providing a settling section in said cell, preferably in the top portion thereof, providing a removable bucket or container or other means in said cell below the level of electrolyte therein for removing accumulated sludge from said section, circulating electrolyte into and through said section at least to the proximity of the settling section to permit sludge in said electrolyte to settle therefrom into said section and at least periodically removing sludge from said electrolyte from said section.

The invention will now be further described in connection with the drawing in which there is shown in diagrammatic form a cell structure according to the invention.

The cell comprises an outer member or shell 1 and a cover 2. For simplicity's sake the details of the inside structure, wiring, electrodes, etc. are to an extent omitted.

Inside the cell there are provided a plurality of electrodes, in this instance anodes 3, surrounded by cathodes 4. Both the anodes and cathodes are cylindrical. The electrolyte is caused to circulate in the direction shown by the arrows, the driving force being (1) the evolution of heat at the anode which warms the electrolyte and thus lowers its density with resulting tendency to rise and (2) the evolution of hydrogen gas at the cathode which also lowers the density of the electrolyte. There are provided for coolant circulation a tubes and sheets arrangement or heat exchanger structure into which coolant is passed at 5 and from which coolant is removed at 6. The tubes of the heat exchanger are the cathodes 4, in this embodiment.

The top of the cell 2 is separated from the bottom or heat exchanger-cathode section by a Teflon apron or flange 20 thus electrically insulating these two parts of the cell. Electrical connections are shown in the drawing. Only some of the tubes have inserted in them the anodes 3, the remainder of the tubes being used as downcomers such as 21 and 22 for the heated electrolyte. Owing to the rise of heated electrolyte surrounding the anodes and the cooling thereof in the downcomers, there is set up a thermal siphon effect which is relied on in one form of the invention to cause the electrolyte to move into the settling section of the invention. Hydrogen evolution also assists in promoting circulation of electrolyte.

According to the invention there is provided a settling section installed in central downcomer 22, a bucket 8 which is perforated at 9 to provide orifices into which the electrolyte can flow carrying with it sludge suspended therein. In the bucket in which there is a relatively quiet body of electrolyte the sludge settles while electrolyte passes across the top portion of the bucket and ultimately out therefrom as shown by the arrows. The bucket is removable by way of a swivelably attached plate 10 mounted on a swivel 11 and controlled by means omitted for the sake of simplicity. When it is desired to raise the bucket it is pulled up into air-lock chamber 12 through the opening created by swiveling of plate 10. This is accomplished by cable 15 passing through an opening in cover plate 14 on top of air-lock chamber 12. With the bucket inside chamber 12, plate 10 is closed, cover plate 14 is opened, and the bucket removed for disposal purposes. If desired, the gases in chamber 12 (hydrogen and HF), may be vented through appropriate means prior to removing cover plate 14.

It is important that the bucket or settling chamber be cathodic in order to prevent current flow to the bucket or chamber. This is accomplished by attaching one lead of the main cathode connector to the metal cable which supports the bucket or chamber. The cable is passed through electrical insulators 25, Teflon for example, in passing through plates 14 and 10.

In lieu of the bucket it is within the scope of the invention to employ equivalent means, for example, such an arrangement with which sludge is sucked intermittently or continuously from the settling or quiescent zone or section together with whatever portion of the electrolyte may come therewith and the electrolyte after removal of the sludge therefrom returned to the cell as may be desired.

In Ser. No. 680,123, filed Nov. 2, 1967, now U.S. Pat. No. 3,511,762, there is described and claimed an electrode assembly suitable for use as electrode in the present invention structure. That electrode generally described comprises a porous element; a first conduit means in communication with a first surface of said porous element for introducing a reactant feedstock into the pores of said porous element; and a second conduit means in communication with a second surface of said porous element for withdrawing reaction product and any unreacted feedstock from said pores; said second surface being spaced apart from said first surface. In said application, there is also described and claimed a process for the electrochemical conversion of an organic compound feedstock, which processes comprises (a) passing an electric current through a current-conducting electrolyte composition contained in an electrolysis cell provided with an anode and a porous cathode which is not wetted by said electrolyte, said cathode being provided with a first surface for introducing feedstock into the pores of said cathode and a spaced apart second surface for withdrawing reaction product and any unreacted feedstock from said pores; (b) passing a stream of said feedstock through said first surface of, and into the pores of, said cathode; (c) within said pores, at least partially converting at least a portion of said feedstock; (d) withdrawing a stream of reaction product and any remaining unreacted feedstock from within said pores of said cathode through said spaced apart second surface and from said cell as a cell effluent stream; and (e) recovering said reaction product from said cell effluent stream. Generally that application provides an electrode assembly and method suitable for electrochemical fluorination process using, for example, current-conducting essentially anhydrous liquid hydrogen fluoride electrolyte and being introduced into the pores of said porous element which is preferably a porous carbon, a fluorinatable organic compound, for example, an organic material containing from about one to eight carbon atoms, with or without a carrier gas, for example, an inert gas or hydrocarbon gas, the organic compound being among others included in the following: Alkanes, alkenes, alkynes, amines, ethers, esters, mercaptans, nitriles, alcohols, aromatic compounds, and partially halogenated compounds of both the aliphatic and aromatic series. It will be understood that the above-named types of compounds can be either straight chain, branched chain, or cyclic compounds. Partially chlorinated and the partially fluorinated compounds are the preferred partially halogenated compounds. The presently preferred starting materials are the saturated and unsaturated hydrocarbons (alkanes, alkenes, and alkynes) containing from one to six carbon atoms per molecule. The presently more preferred starting materials are the normally gaseous organic compounds, and particularly said saturated and unsaturated hydrocarbons, containing from one to four carbon atoms per molecule. A run was carried out for the electrochemical fluorination of methane employing an electrolysis cell containing an anode essentially of porous carbon (NC–60) anode comprising a hollow cylinder 1 inch in diameter, one and one-half inch long, and having a one-fourth inch wall thickness. Its bottom surfaces was sealed. The anode was surrounded by a circular cathode consisting of a nickel screen. The anode and cathode were immersed in an electrolyte the composition of which was maintained at KF·2HF by addition of HF during the run. The conversion was carried out at a temperature of 82° C, a current of 5 amps, a current density of 167 milliamps per square centimeter of anode geometric surface, and a methane feed rate of 40 ml/minute.

In a commercial cell, the current is about 30,000 amps and the cell contains 3,000 pounds of electrolyte which circulates at a rate of about 1 foot per second. Depending on the water content of materials passed to the cell, feedstock and HF, sludge will accumulate at the rate of 1 to 10 pounds per day. Removal of the bucket from the cell with its contained sludge is required once per day. The bucket is 6 inches in diameter and placed inside the center, or largest downcomer which has a diameter of 12 inches. The top of the bucket is located just below the level of electrolyte in the cell indicated by number 30 in the drawing. The bucket is 12 inches in height and contains an inlet orifice 1 inch in diameter plus a corresponding outlet orifice for the electrolyte. Velocity of the electrolyte in the bucket is negligible.

During this operation the bucket of the invention and its support are located in the upper portion of the cell as shown in the drawing. Sludge collecting in the bucket is periodically removed as already described.

In Ser. No. 683,089, filed Nov. 2, 1967, now U.S. Pat. No. 3,511,760, there is described and claimed a process for the electrochemical fluorination of a fluorinatable organic compound feedstock, which process comprises passing an electric current through a current-conducting essentially anhydrous liquid hydrogen fluoride electrolyte contained in an electrolysis cell provided with a cathode and a porous anode; passing said feedstock into the pores of said anode and therein at least partially fluorinating at least a portion of said feedstock; passing fluorinated product and any remaining unfluorinated feedstock from within the pores of said anode; and recovering fluorinated product from an effluent stream from said cell.

The disclosures of said applications are incorporated herein by reference.

The present invention finds wide applicability for the intermittent or continuous purification of electrolytes in electrolytic processes. Reference to the foregoing applications has been made to round out this disclosure.

Among the art available during the preparation of this case were the following patents: U.S. Pat. No. 2,985,568, issued May 23, 1961, U.S. Pat. No. 3,255,097, issued June 7, 1966, U.S. Pat. No. 3,404,083, issued Oct. 1, 1968.

Reasonable variation and modification are possible within the scope of the foregoing disclosure, the drawing and the appended claims to the invention the essence of which is that there have been provided apparatus and method for conducting electrochemical reactions employing an electrolyte which accumulates sludge therein during the operation, the method employing a natural convection in the cell to cause electrolyte and sludge suspended therein to pass into a quiescent or settling zone for settling of sludge from the electrolyte, the sludge being removed from said settling zone as by a bucket or suction or otherwise, and the apparatus as described providing in the flow of electrolyte in the apparatus a zone shielded from the turbulence so that the electrolyte can allow sludge to settle as into a bucket or container in the settling or quiescent zone for its removal according to the method of the invention.

I claim:

1. In an electrochemical cell structure comprising electrode means and adapted to contain an electrolyte wherein sludge is formed during an electrochemical reaction, the improvement comprising means arranged in said cell adjacent at least one electrode means so that during operation of said cell at least a natural convection due to heat released at said electrode will cause the electrolyte contained in said cell to circulate and keep said sludge in suspension; a container means disposed in a settling zone above the bottom of said cell but adapted to be disposed below the electrolyte surface, said container means being removably suspended in said cell and further having means adapted to permit circulating electrolyte to enter an upper portion thereof and means to permit said circulating electrolyte to leave from an upper portion thereof, said means being adapted such that sludge in said circulating electrolyte settles into said container means and means for removing said container means periodically from said cell.

2. A structure as in claim 1 wherein the cell is provided with means restricting free motion of the electrolyte therein thus to cause circulation of said electrolyte upwardly into and through said settling section.

3. A structure according to claim 2 wherein the cell is provided with sheets and tubes arrangement forming a heat exchanger wherewith to cool the electrolyte in said cell, the tubes being fixed into the sheets to provide circulation of the electrolyte through the tubes in an upwardly direction due at least to the natural convection of the electrolyte due to heat released at an electrode when the cell is in operation.

4. A structure according to claim 1 wherein there is provided in the settling zone in the line of flow of electrolyte thereinto a flow orifice through which the electrolyte is caused to flow thus producing in the line of flow through said orifice beyond said orifice a slowup of motion of the electrolyte so that said sludge may settle therefrom into said container means.

5. A structure according to claim 1 wherein in said cell there are provided means to cool said electrolyte, said means occupy space in said cell causing a restriction through which electrolyte travels upwardly at least due to natural convection and said settling section communicates with and receives the electrolyte at a level above the bottom of said cell.

6. A method for operating an electrochemical cell which comprises providing a settling section in said cell above the bottom thereof, providing a removable bucket or container in said settling section of said cell below the surface of the electrolyte therein, employing natural convention due to heat liberated at an electrode for circulating electrolyte containing sludge suspended therein upwardly from the bottom of said cell into and through said section and at least into proximity of the top of said bucket, said section having means adapted to cause a slow-up of motion of the electrolyte passing therethrough to permit sludge in said electrolyte to settle therefrom into said bucket and at least preiodically removing sludge from said electrolyte by removing said bucket.

7. An electrolytic cell structure comprising a cell shell, a tubes and sheets heat exchanger structure disposed within said cell in a manner to provide that said sheets are substantially horizontally disposed in said cell and that said tubes are substantially vertically disposed in said cell and extend between said sheets providing for fluid communication from below the lower said sheets to above the upper said sheets, an electrode disposed in at least one of said tubes, space between the wall of said tube and said electrode to permit electrolyte in said cell in operation to rise through said tube to above the upper of said sheets to below the lower of said sheets, a container means adapted to be removably suspended in said cell below the surface of electrolyte, said container having means permitting circulating electrolyte to enter an upper portion thereof and means to permit circulating electrolyte to leave from an upper portion thereof, means for periodically removing said container from said cell, said container providing a relatively quiescent place in said cell to allow particles of matter in the circulating electrolyte to settle therefrom into the bottom portion of said container.

* * * * *